(12) United States Patent
Ellenby et al.

(10) Patent No.: US 8,228,413 B2
(45) Date of Patent: Jul. 24, 2012

(54) PHOTOGRAPHER'S GUIDANCE SYSTEMS

(75) Inventors: Peter Ellenby, San Francisco, CA (US); Thomas Ellenby, San Francisco, CA (US); Joseph Page, La Jolla, CA (US)

(73) Assignee: GeoVector Corp., San Francisco, CA (US)

( * ) Notice: Subject to any disclaimer, the term of this patent is extended or adjusted under 35 U.S.C. 154(b) by 230 days.

(21) Appl. No.: 12/584,139

(22) Filed: Sep. 1, 2009

(65) Prior Publication Data
US 2011/0050909 A1 Mar. 3, 2011

(51) Int. Cl.
H04N 5/225 (2006.01)
H04N 5/222 (2006.01)
(52) U.S. Cl. ............... 348/333.02; 348/207.11
(58) Field of Classification Search ............... 348/201.1, 348/207.11, 333.01, 333.02
See application file for complete search history.

(56) References Cited

U.S. PATENT DOCUMENTS

| | | | | |
|---|---|---|---|---|
| 6,459,388 B1 * | 10/2002 | Baron | ............ | 340/996 |
| 6,970,189 B1 * | 11/2005 | Bernstein et al. | ............ | 348/211.2 |
| 7,805,066 B2 * | 9/2010 | Wexler et al. | ............ | 396/49 |
| 7,898,572 B2 * | 3/2011 | Edwards et al. | ............ | 348/211.2 |
| 2003/0169350 A1 * | 9/2003 | Wiezel et al. | ............ | 348/239 |
| 2009/0115855 A1 * | 5/2009 | Gotoh et al. | ............ | 348/207.11 |

* cited by examiner

Primary Examiner — Timothy J Henn
(74) Attorney, Agent, or Firm — Integrity IP (57) ABSTRACT

A photographer's guidance system is formed of a computer-based processor made responsive to location, time of day, manual user inputs, among others to provide photo exposure suggestions based upon information stored as photo set-up descriptors. In response to user requests in combination with present conditions such as time, location weather, etc., a database request is executed against stored photo set-up data to produce a result set of photo set-up descriptors. These descriptors are used both manually and automatically to assist a photographer user in setting up a photo exposure in agreement with the prescribed parameters. These systems may be directly coupled with a DSLR type camera and may operate via user controls and interfaces thereof. In alternative versions, these system have independent control and user interfaces with outputs coupled to a DSLR control. In still further other versions, an entirely manual system leaves it to the photographer to set up a camera of the art in agreement with parameters presented in resultsets.

3 Claims, 11 Drawing Sheets

ISO 200
F 5.6
S = 1/200

Fig 6B

ISO 200
F 16
S = 1/30

Fig 6C

ISO 100
F 32
S = 1/3

PHOTOGRAPHER'S GUIDANCE SYSTEMS

BACKGROUND OF THE INVENTION

1. Field

The following invention disclosure is generally concerned with photography equipment and specifically concerned with an electronic photographer's guidance system which provides set-up information in accordance with various real-time stimuli.

2. Prior Art

Computer technologies have enabled remarkable changes to many of our everyday activities. From how we communicate with our families, to how we plan a journey—computers today greatly influence the manner in which we performed many activities. Even something so artful and beautiful as photography can be greatly improved and enhanced by way of computer supporting systems. With the advent of digital cameras, and most particularly 'high-end' or 'prosumer' digital single lens reflex DSLRs type cameras, great opportunity arose for photographers to benefit from advances in general computer technologies.

In one illustrated example, a digital camera coupled with a GPS position determining system includes a computer to provide digital data files of photographs with names which are particular to the locations from which the photograph is made. Such systems are first taught in exhaustive detail in U.S. Pat. No. 6,657,661 by inventor Cazier of Colorado. In a peculiar shortcoming of these systems, image files are given names associated with the places from which the image was captured rather than the names associated with the location of the image subject matter. For example, a photographer on the bayfront shore in Richmond Calif. may make photographs of San Francisco, Oakland, Alcatraz, Sausalito, Madera and San Rafael. However, all files would be named with a prefix "Richmond" in accordance with the teachings of Cazier. This, despite the fact that none of the images are actually of Richmond. While Cazier's teachings are probably useful for tourists visiting Paris, these systems are limited and their applications quite narrow in scope.

Another important illustrative attempt to couple advanced computing systems and location based informatics can be discovered in U.S. Pat. No. 7,477,295. In this invention by Tanaka of Japan, a GPS module determines position of the camera unit and the information is transmitted from the GPS to the camera via radio I/F. after a photograph is made, it is stored as an electronic file on a local memory card. In addition to the image, a thumbnail (highly abbreviated) image is also stored. Further, a computer calculates a camera attitude and range (distance between photograph site and the object being photographed) according to position coordinate data. Measurement data, i.e. position coordinate data, object position coordinate data, camera attitude, distance between photographer site and the object, all may be attached to the digital file which represents the image. Thus, data measured during the exposure may be appended to the digital files of images.

In yet another important invention of the art entitled "Electronic guide system, contents server for electronic guide system, portable electronic guide device, and information processing method for electronic guide system" the invention presented by inventors Kobuya et al, of Sony Corp. was granted Oct. 31, 2006 as U.S. Pat. No. 7,130,742. An electronic tour guide is affected for tourists where a server provides guide information including places of interest as well as map data. The server additionally provides content in agreement with a user's predefined specifications. Custom tour guide content is stored in an electronic guide apparatus. Upon arrival at a destination, for example at an airport counter, electronic guide apparatus with custom information preloaded thereon may be collected and used by the user to take to a selected destination for further consumption of custom content.

While systems and inventions of the art are designed to achieve particular goals and objectives, some of those being no less than remarkable, inventions of the art have limitations which prevent uses in new ways now possible. Inventions of the art are not used and cannot be used to realize the advantages and objectives of the invention taught herefollowing.

SUMMARY OF THE INVENTION

Comes now, Peter Ellenby, his brother Thomas Ellenby and their friend Joseph Page with inventions of photographer's guidance systems including photographic apparatus for making photograph images where the apparatus provides suggestions regarding exposure parameters which related to present and future conditions. It is a primary function of these guidance systems to provide computer based systems which respond to various stimuli by providing suggestions to a photographer how a prescribed photo exposure may be assembled and created.

An electronic photographer's guidance system includes a preprogrammed application-specific computer arranged to recall data from a library of stored photo set-up descriptors. Photo set-up descriptors are devised and provided to the library in advance of use of the systems. A photo set-up descriptor includes specification of a photograph exposure set-up parameters including but not limited to: shooting vantage point, shooting angle, camera settings, environment, time of day, among others. Upon various of program stimuli, the computer by way of a query engine recalls at least one photo set-up descriptor of which certain details may be presented graphically at a user interface such as a display or monitor. In accordance with photo set-up details suggested, a user photographer manipulates her position, the camera pointing direction, camera settings to effect a photo of exposure in agreement with the photo set-up descriptor.

A photography tour is realized where a set of related photo set-up descriptors is presented serially. For example, a plurality of photo set-up descriptors all associated with the fine city of Amsterdam, Netherlands may be presented serially whereby a photographer may execute a photo exposure(s) for each in turn moving from one to the next to be led about the most important photographic landmarks of Amsterdam. Alternatively, a photography tour of these systems may also include a walking tour of a single landmark such as the Coliseum of Rome. A plurality of photo set-up descriptors each relating to the Coliseum can be dispensed serially with respect to a logical walking path in a manner whereby a photographer may walk about, shooting photographs in accordance with the specified parameters, to form a still image visual documentary of a visit to the famous Roman landmark.

In general, these systems are formed of the following electronic modules coupled together as described. A programmed computer arranged with stored application-specific program code and a query engine coupled to a photo set-up library. Query requests produce recall of a resultset including at least one photo set-up descriptor object which contains a photo exposure specification including among others: photo shooting vantage, camera attitude, and camera settings. These photo set-up descriptors may be presented at a display type user interface where partial representations of them may be made visually and/or graphically. A user photographer may further interact with a resultset of photo set-up descriptors by scrolling through a plurality, for example by way of a control module unit, which further drives code execution with respect to the application.

A photography tour is presented when a recalled set of photo set-up descriptors relates to a common theme or objective. For example, one type of photography tour is arranged about various sites of a single city. Presented in logical order, a plurality of photo set-up descriptors may be arranged one after another in a series which follows a spatial pattern. For example, a certain photography tour may be arranged to follow a prescribed possible route. A photographer makes photograph exposures in accordance with photo set-up descriptor details presented to her as it is synchronized with a bus journey. For example, the famous double-decker bus tour of London with well-known routes may be coupled with a photography tour of systems taught here. That is, a user photographer deploying these systems may ride a double-decker bus about London while advancing through a provided set of photo set-up descriptors in order to provide photography guidance and photo suggestions of sites in London.

While photography tours are a primary function of these systems, photography lessons are additionally an important aspect. A resultset of photo set-up descriptors may be formed in response to a user request for a particular photography lesson. For example, a photography lesson on using rain puddles to form images with strong reflections therein may be provided. A series of well-developed photo set-up descriptors each with a careful consideration of shooting angle may be provided to teach a photography student best shooting positions in view of the relative positions of landmarks with respect to reflecting surfaces, and further with respect to lighting sources and their positions locations. Thus, these photographer's guidance systems are designed to support both photography tour and photography lesson objectives.

Photography tours and photography lessons may be provided to a user upon direct request. For example, a user may specify "landmark tour of Egypt". The computer is arranged to execute an application where such user choices may be conveyed to the program logic. In response to such choice, the computer recalls a plurality of photo set-up descriptors in agreement with that selection; i.e. photo set-up descriptors which relate to landmarks in Egypt. As an alternative a user may set the computer into a "landmark" mode—and the computer can rely upon a GPS position determining system to further specify a request query. That is, rather than a manual selection of "Egypt" a user may rely upon the computer's self determination of location prior to recall of photo set-up descriptors from which a tour is comprised. Indeed, a computer may run in various modes whereby options set by a user, or provided in a default scheme, or determined by measurement, effect a manner in which a set of photo set-up descriptors from which a tour or lesson is comprised are recalled. The application supports various modes and each of these modes may cause a different query to be run against data stored in the library resulting in different photography tours and photography lessons.

In all cases, a programmed computer runs a request query against a library of stored photo set-up descriptors to produce a resultset of at least one photo set-up descriptor which may be applied to a camera automatically or manually to realize the photo exposure in accordance with details of the photo set-up specification.

OBJECTIVES OF THE INVENTION

It is a primary object of the invention to provide a photographer's guidance system.

It is an object of the invention to provide photographic equipment which suggests parameters for photographic exposures in response to requests by a photographer.

It is a further object to provide computer based photographic equipment with a prescribed library of stored exposure data.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

PREFERRED EMBODIMENTS OF THE INVENTION

In accordance with each of preferred embodiments of the inventions, photographer's guidance systems are provided. It will be appreciated that each of the embodiments described include an apparatus and that the apparatus of one preferred embodiment may be different than the apparatus of another embodiment. Accordingly, limitations read in one example should not be carried forward and implicitly assumed to be part of an alternative example.

Figure 1:
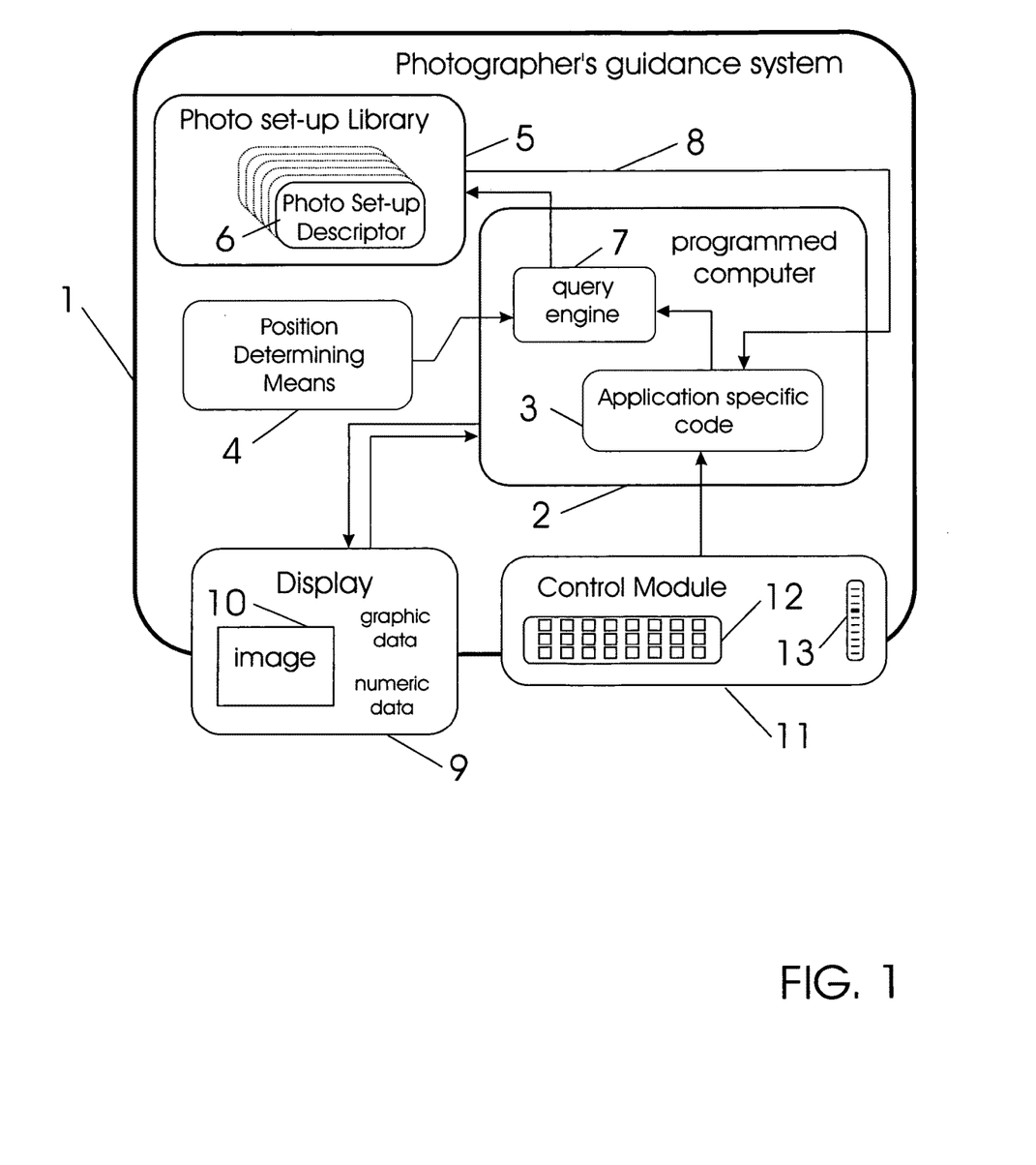
FIG. 1 is a block diagram of a photographer's guidance system and its major sub-systems.

With reference to FIG. 1, one gains a most complete understanding of a general version of these photographer's guidance systems. An example photographer's guidance system 1 is primarily comprised of a programmed computer 2 with application-specific program code 3, a position determining means 4, and a photo set-up descriptor library 5.

Application-specific program code is devised and provided to execute control logic which regulates transactions between various of system components. Code is prepared with knowledge and understanding of system objectives and system architecture. The code which is particular to the structure and nature of all elements taught herein, is stored in a manner whereby it may be executed from time-to-time when the device is performing in normal use.

A position determining means such as GPS receiver is arranged with its reference point coupled with the device—that is, it is set to determine the position/location wherever the camera is at any given time. In most versions this merely means locating the GPS antenna within the system primary hardware. While elements of these systems may be implemented as distributed systems, i.e. in particular the photo set-up library, there is a primary hardware unit which is necessarily mobile and serves as a position reference for cooperating parts. In most preferred versions, the primary hardware unit includes system elements described and additionally an integrated DSLR.

The photo set-up library 5 is a data storage apparatus and may be deployed as a conventional database. These databases include mechanisms such as custom-designed schema. In addition, a photo set-up library of these systems includes preloaded stored data. In particular, a plurality of photo set-up descriptors 6. A photo set-up descriptor is comprised of a handle, a parameter list such as name-value pairs, executable code, and sometimes one or more images. A most important element of a photo set-up descriptor is a geometric construct and definition of a viewpoint or shooting vantage point. There is a one-to-one correspondence between photo set up data records and viewpoints. That is, each photo set-up descriptor includes exactly one viewpoint.

Another important feature of a photo set-up descriptor is its associations. By way of various parameters or record fields, a photo set-up descriptor forms an association with some reference(s). This is useful for sorting operations. In one example, a certain photo set-up descriptor may have an association with a location—for example: Washington, D.C. In another example, a photo set-up data record may have an association with a particular landmark. The Washington Monument is a landmark popular with tourists. For purposes of this discussion, a 'photo set' or 'resultset' collection of photo set-up descriptors is generally particular to some common subject matter which makes a good graphic image such as a landmark like the Washington Monument. Thus, a subject of interest may be represented by a 'photo set' which contains information about each of its members; i.e. photo set-up descriptors. It is important to understand that the viewpoint specification of any photo set-up descriptor or 'object' is generally not colocated with the photo subject. In other words, the position of the photo set-up viewpoint is normally different than the position in which the subject of the photo lies.

Many other types of associations are also useful. For example, a certain photo set-up descriptor may include a 'season' association—for example 'spring'. A photo set-up descriptor may include an association characterized as a photographic effect or feature—such as 'reflection'. Many other photo set-up descriptor associations will become more apparent in consideration of examples presented in detail hereinfollowing. It should be further appreciated that while not all possible associations can be described here due to the fact that their number is infinitely great—one will understand that the essence and core of the invention doesn't change when a new type of association is introduced. The principal which is to be clearly understood is that associations may be attached to photo set-up descriptors; and sorting and recall based upon such association of stored photo set-up descriptors may be affected.

The position determining means conveys position data to the computer in response to an initialization step and sometimes continuously throughout operation. Based upon position information received, among other information such as association specifications, a query engine 7 forms a database query to recall stored information. A resultset (plurality of descriptors) 8 is returned to the computer—and this resultset includes all photo set-up descriptors which meet the parameter definitions of the query. A resultset may include one or more photo set-up descriptors.

These photo set-up descriptors may be reviewed and examined by a user. The application-specific code is arranged to parse the photo set-up descriptors and 'play' them, in example, one-by-one at a display type visual user interface 9. Most particularly, images 10 may be presented alongside with graphic and text/numeric data.

While viewing photo set-up descriptors, a user in may use a control module 11 with tactile peripherals such as key-switches 12 or thumbwheel 13 to interact with the application in consideration with the photo set-up descriptor presented. For example, a user may 'select' a particular photo set-up descriptor for further action.

Accordingly, a most general version is presented as the block diagram of FIG. 1. While these systems are sometimes arranged independent of any camera apparatus, certain versions are preferably devised in close connection with and sometimes highly integrated with digital cameras.

Figure 2:
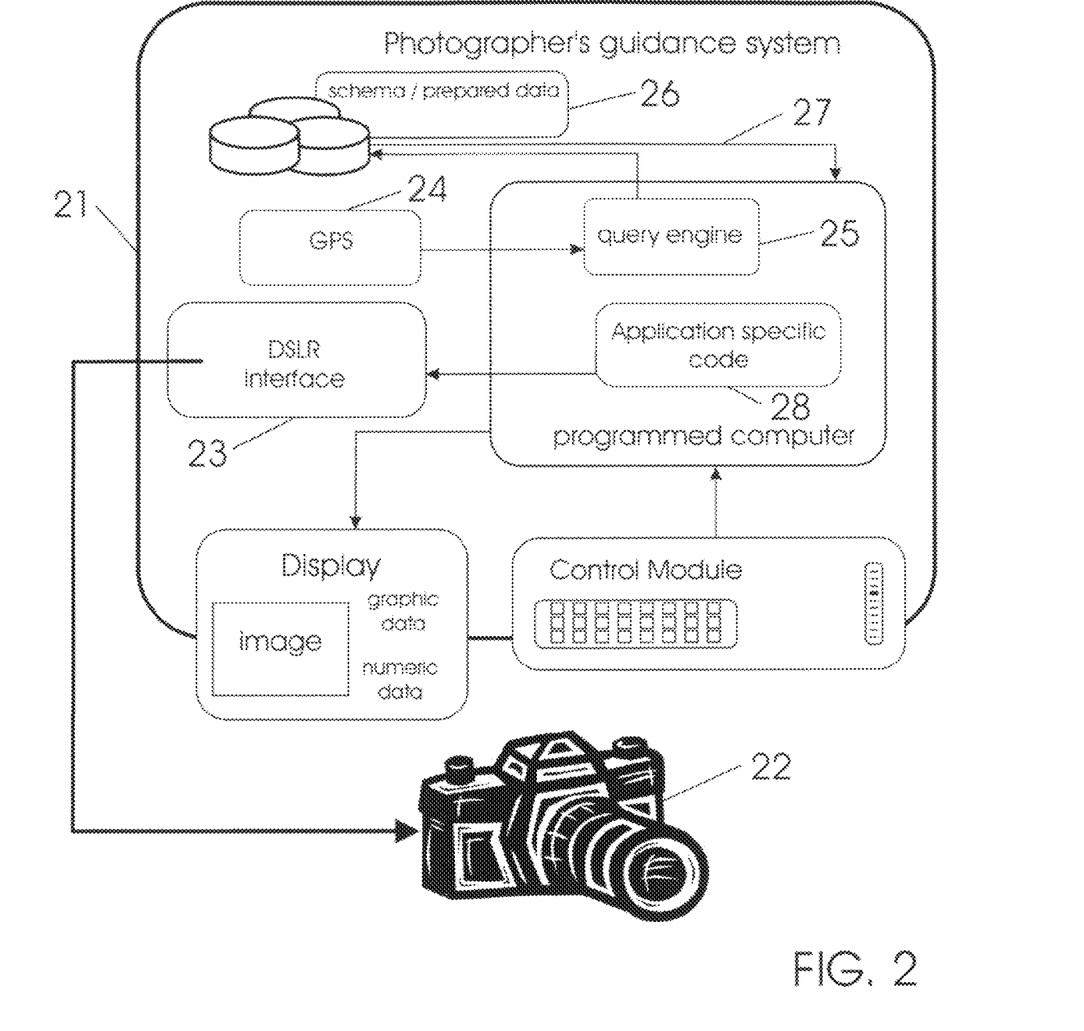
FIG. 2 is another important block diagram where a computer based system taught here is coupled to a digital camera.

FIG. 2 describes via diagram an important version where the system is directly integrated with a camera. While some modern digital cameras today may include powerful computing facility, large memory and sometimes even GPS, they typically lack other elements described here throughout this description. In versions of these apparatus where a photographer's guidance system 21 is tightly integrated with a DSLR 22, a DSLR interface 23 may be arranged as part of the system whereby control commands generated by the system in agreement with a user selected photo set-up descriptors are transmitted to the DSLR and operational states of the camera are adjusted in accordance with the photo set-up descriptor parameter details. In these versions, a GPS 24 presents location data to the query engine 25 which generates a database query in view of a prescribed arrangement of stored photo set-up data—each unique photo set-up having associated therewith a viewpoint spatial construct. That is, the database schema and prepared data 26 are sometimes provided with a consideration of the location and nature from which a similar photograph may be made. Details regarding photo shooting viewpoint or shooting vantage are passed with a photo set-up descriptor 27. In addition, other photo set-up information may include attitude, lens magnification, shutter speed, exposure information, et cetera. Recalling from the description of FIG. 1, a user may select one from a plurality of photo set-up descriptors. Once a photo set-up descriptor is chosen, it may be used by the application-specific code 28 to drive the DSLR interface. The DSLR interface appropriately coupled to a digital camera, changes the operational states of the camera 22 in agreement with information recalled as the photo set-up descriptors or resultset.

In review, a user may take a mobile unit of these systems to a site of interest and automatically receive photo suggestions by way of proposed images (as defined by recalled photo set-up descriptors). A user may further specify parameters such as 'reflections at sunset' to limit or narrow the scope of the subject matter offered as photo suggestions. Upon choosing an image from the group of images in the resultset, the computing system presents the user with a parameter set of details which can be used by the photographer to bring about an actual exposure similar to the one suggested. Foremost among these, is a shooting vantage or image viewpoint. A user may specify that he'd like to make a photograph of the Washington Monument with a reflection in the nearby reflecting pond. On the selection, the computer directs the user to a particular viewpoint where such photograph which meets the criteria can be made. The computer 'knows' of this viewpoint because images stored in a database have attached thereto a geometric definition of the viewpoint or shooting vantage which corresponds to one in which the stored image was made. Once a user arrives in the location specified by the photo set-up descriptor, and points the camera with an attitude similar to that described, the DSLR interface can adjust the camera for all additional exposure settings prior to release of the shutter.

Figure 3:
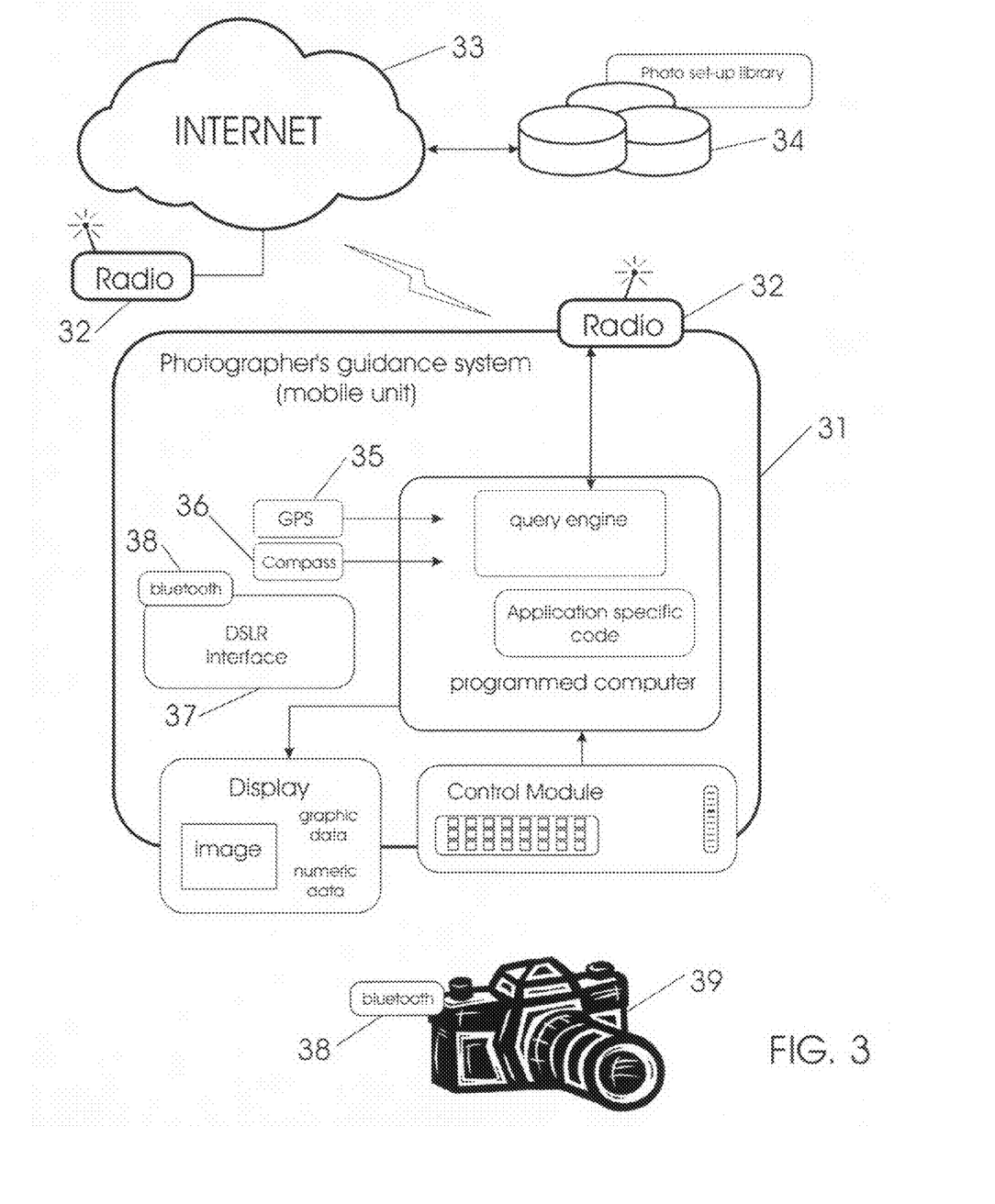
FIG. 3 illustrate additional important couplings between cooperative related systems and these photographer's guidance systems.

FIG. 3 illustrates important communications aspects of these photographer's guidance systems 31. Because some comprehensive versions of these systems include very complete libraries of photo set-up descriptors, it becomes convenient to embody them as remote servers. A radio (wireless) communications link 32 is established whereby a mobile device as described is coupled to and exchanges messages with the Internet 33. Calls to a remotely located photo set-up library 34 (server) produce a reply over the same wireless communications link whereby the photographer's guidance system mobile unit receives a limited set of data including a plurality of highly relevant photo set-up descriptors. One will appreciate that mobile systems of limited memory and computing resources benefit when coupled to remote servers as described. In addition, self-contained versions with all data on-board are further limited with respect to frequent updates. Remote photo set-up libraries offer real-time fresh updated data to all users who might couple therewith by a single one-time change at a library arranged as a remote server.

When a mobile unit is carried to a shooting location or venue, the GPS 35 measures the device's position and reports position data to the application-specific programmed computer. In one special alternative version, an electronic compass 36 may be also included. Device attitude information may also be used in some data queries to request a photo set-up descriptors via a more narrowly defined query. If a photographer who uses these systems in Washington, D.C. is located at 9th St. NW in the mall facing West, the compass can detect the pointing direction or attitude of the mobile unit and provide the query engine this information. Thus merely pointing West from this location causes the photo set-up descriptors to be recalled to all have the Washington Monument as an image subject. However, if the device is turned 180° and pointed East, then the resultset returned only includes photo set-up descriptors having the Capitol has a subject. That is, the pointing attitude drives the query engine to recall data which relates to that which is being pointed at. Accordingly, both position and attitude can be used to form queries to recall specific photo set-up descriptors.

In one important version, the compass has a reference direction—the direction which is subject to the attitude determination. This reference direction is preferably coupled to the optical axis of a camera in some systems; and more particularly the lens of the camera. When the camera is pointed, the compass determines the pointing direction of the camera rather than an arbitrary reference of the mobile unit. Accordingly, recalled photo set-up recordsets (i.e. a plurality of photo set-up descriptors) can depend upon the instantaneous position and attitude of the camera.

A second important radio communications link is also useful in some versions. The mobile unit is sometimes coupled to a camera by way of a Bluetooth type communications link 38. A DSLR 39 having a complementary Bluetooth transceiver permits the camera to be in continuous data communication with nearby photographer's guidance system mobile units. These alternative versions offer some hardware variation each version having important benefits and drawbacks.

A great richness of information relating to any particular photograph exposure, or photo set-up becomes available in normal operation of these systems. While it is known in the art to save an image file with pixel data alongside metadata, for example in accordance with the IPTC format used with TIFF or JPEG image data files, it was certainly not heretofore possible to automatically append image files with data relating to photo subject matter, the environment, and certain aspects of the exposure characteristics. For example, in systems of the art it is presently impossible to automatically append an image file with information about the subject being photographed. For example, in today's modern cameras when taking a picture of the golden gate bridge, the file metadata does not read "Golden Gate Bridge". It may include the date, exposure details, and manually added fields such as "San Francisco"; or even "San Francisco Bay Shots". But one could not achieve a field label reading "Golden Gate Bridge" without having to stop and enter text data manually describing each and every subject matter which can be photographed. It is particularly cumbersome to label each photograph as it is made. As such, "Golden Gate Bridge" in most circumstances is too narrow or too detailed of a description unless one intends to shoot a series of photographs where each one includes the Golden Gate Bridge. If one decides to photograph another subject, a new text label must be manually prepared. However it is reasonable to answer "San Francisco" as a text label for photographs made during a tourist trip to the city. Many photographs made during the tourist trip would accurately be described as "San Francisco". Since it is a static field applied to all images without regard for what is actually being photographed.

Figure 4:
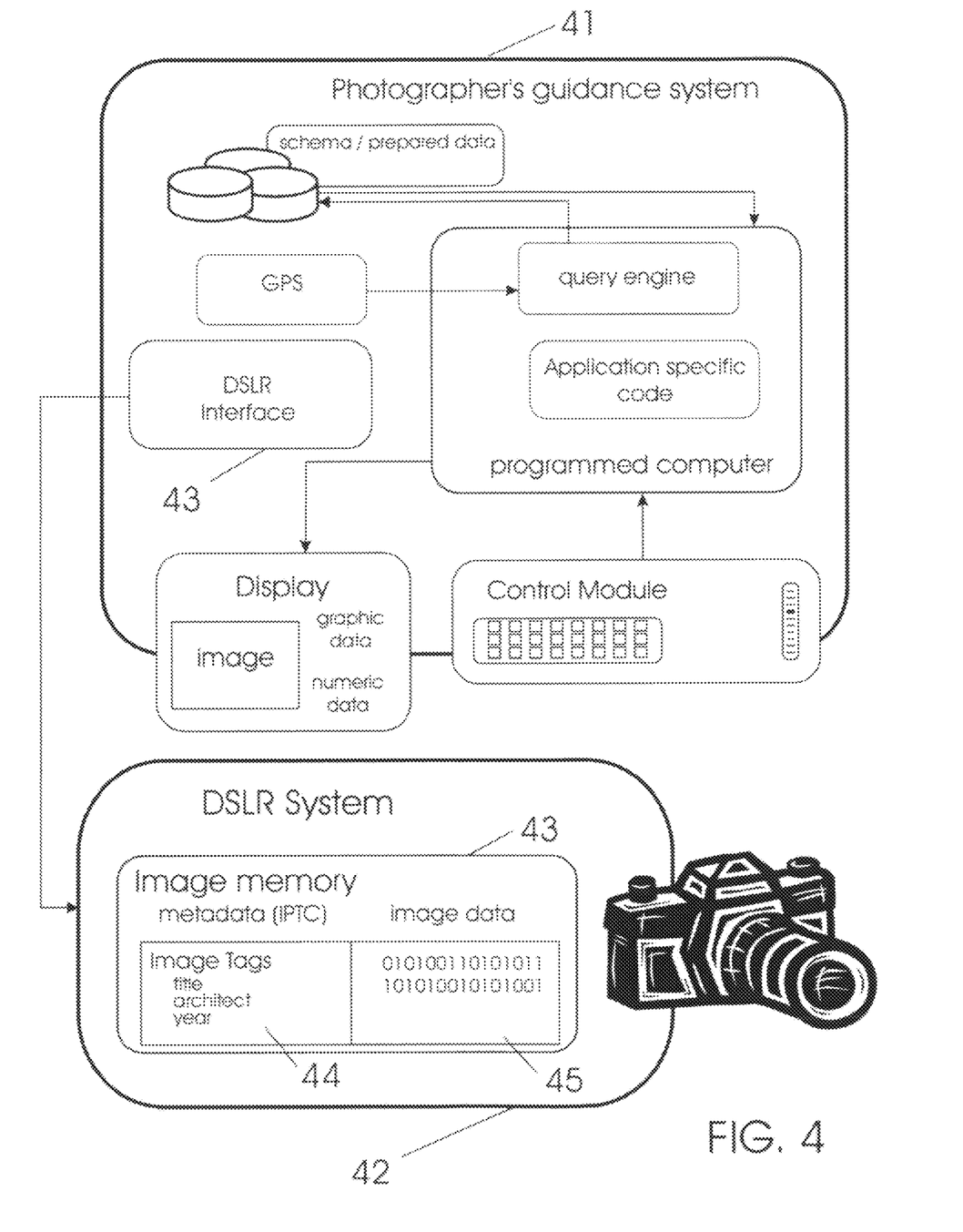
FIG. 4 presents another block diagram with special relation to a DSLR subsystems.

In systems 41 taught here, a photo set-up descriptor may include information about the actual subject of the photograph being made. A photographer on Alcatraz Island pointing her camera 42 West would automatically invoke recall of a photo set-up descriptor including the title of the subject matter the photograph to be made; i.e. "Golden Gate Bridge". Accordingly, "Golden Gate Bridge" can be stored to memory 43. In addition, other 'image tags' 44 relating specifically to the subject being photographed may also be saved as part of the image file—e.g. title; architect; year built; et cetera. These image metadata tags may be stored alongside the conventional image data 45. If the same photographer and then turned approximately 180° to face East and make another photograph, a photo set-up descriptor recalled would have a subject matter title "Treasure Island". The user need not enter these manually, the mere act of pointing the camera towards the subject being photographed invokes an automatic change to metadata stored with the image file.

Information from a photo set-up descriptor is passed from the photographer's guidance system to the DSLR via the DSLR interface whereby the file write system applies data fields to image files in accordance with IPTC style metadata. In this way, automated subject matter labeling is applied to captured images. This scheme is not limited to subject titles. Rather a great deal of information may be similarly apply and associated with image files at the time of exposure. Anything which can be stored as part of a photo set-up descriptor can be finally attached as an image tag because the photographer's guidance system recalls the photo set-up descriptor and all its associated data. Accordingly, image tags now may include far more detail relating to any image captured if image capture is preceded by the step of recalling a photo set-up descriptor. As described herein, this step may be invoked manually by a photographer selection from a plurality of photo set-up descriptors in a photo set-up resultset; or alternatively, in combination with, an automated response taken upon change to a is system position and/or attitude as dynamically measured in real-time.

Figure 5:
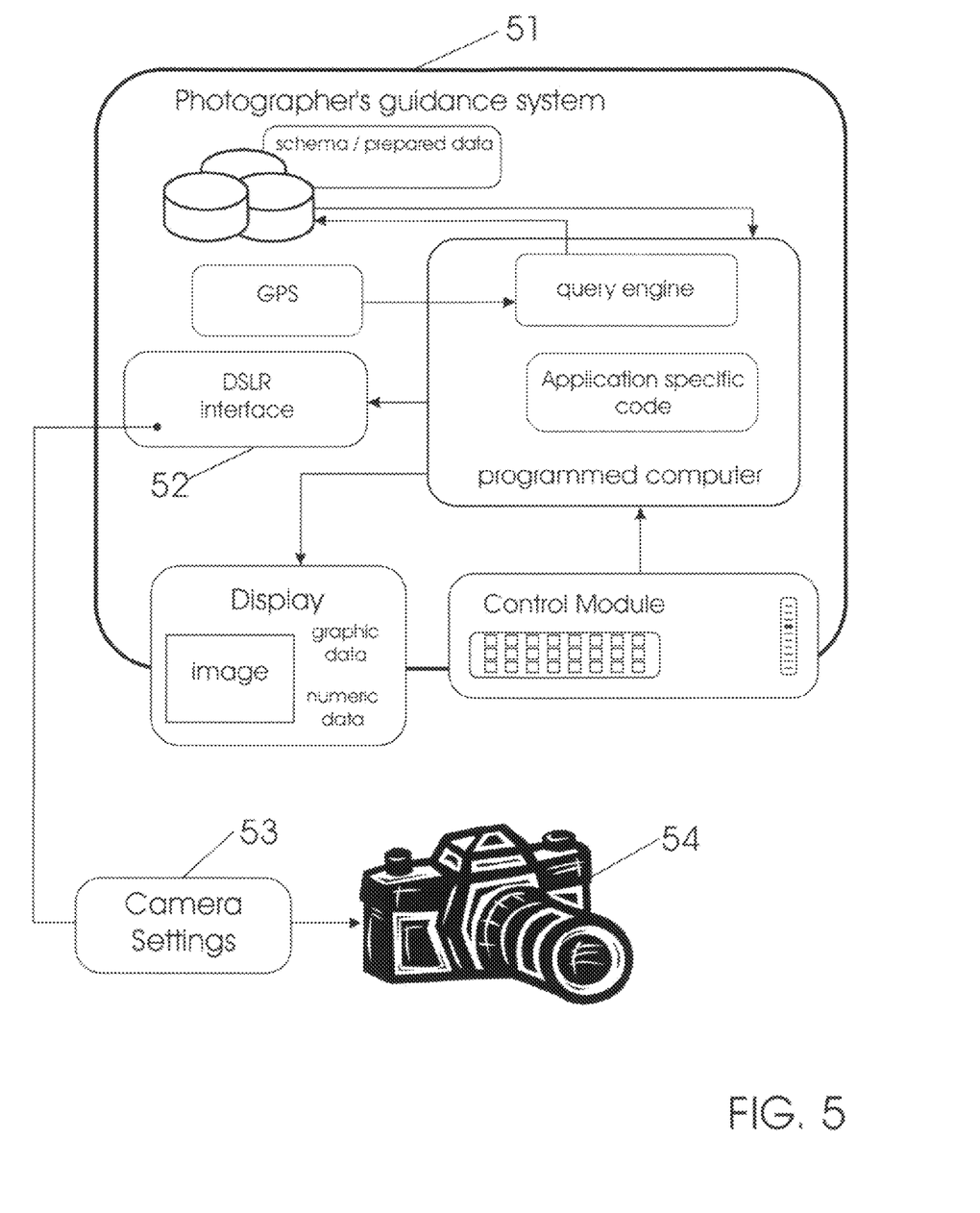
FIG. 5 also presents a similar block diagram to illustrate a relationship to the camera subsystem settings.

FIG. 5 illustrates another important aspect of these photographer's guidance a systems 51. By way of the DSLR interface 52 a camera settings data set 53 is passed to the DSLR (camera) 54. The DSLR may adjust physical operational states of the camera in accordance with data in the received data package. For example, a recalled photo set-up descriptor may include specification for a certain specific shutter speed. As part of a camera settings data set, a value for shutter speed is passed to the DSLR. The camera responds to receipt of such camera setting package, including a shutter speed value by setting the shutter speed in agreement therewith. That is, the next exposure will be made in accordance with the shutter speed prescribed in the camera settings dataset.

Likewise, aperture values, white balance, zoom state (magnification), focus parameters, among other camera settings may be passed into the DSLR from a recalled photo set-up descriptor. The photo set-up descriptor may be one selected from a plurality offered a user, or may be automatically generated in response to a position/attitude change, or a combination of both. Indeed, any setting possible on the camera may be altered in response to receipt of such camera setting datasets in this fashion.

For a most complete understanding of these photographer's guidance systems, their operation and function, several important image based illustrative examples have been developed are presented herefollowing. The following description with reference to the images of FIGS. 6-11 is provided to demonstrate performance of these systems in some important scenarios.

Figure 6A:
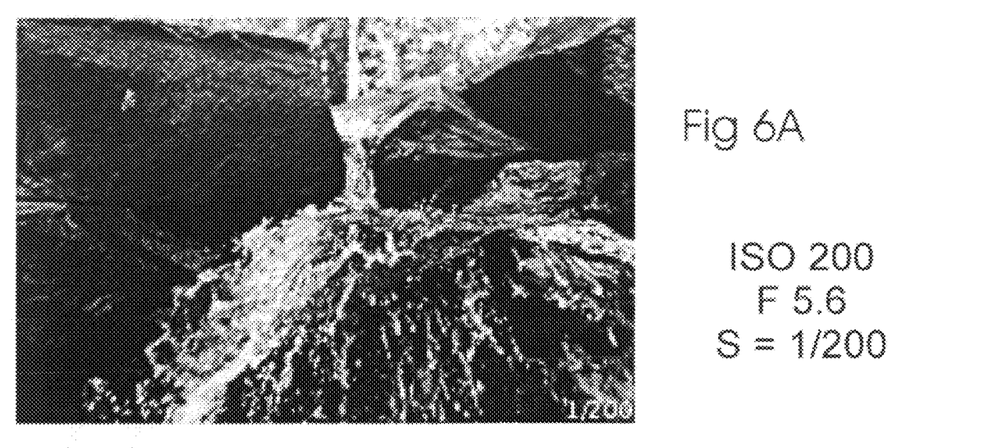
FIGS. 6A-6C are a special image series to illustrate important aspect of an exposure suggestion in accordance with certain embodiments.
Figure 6B:
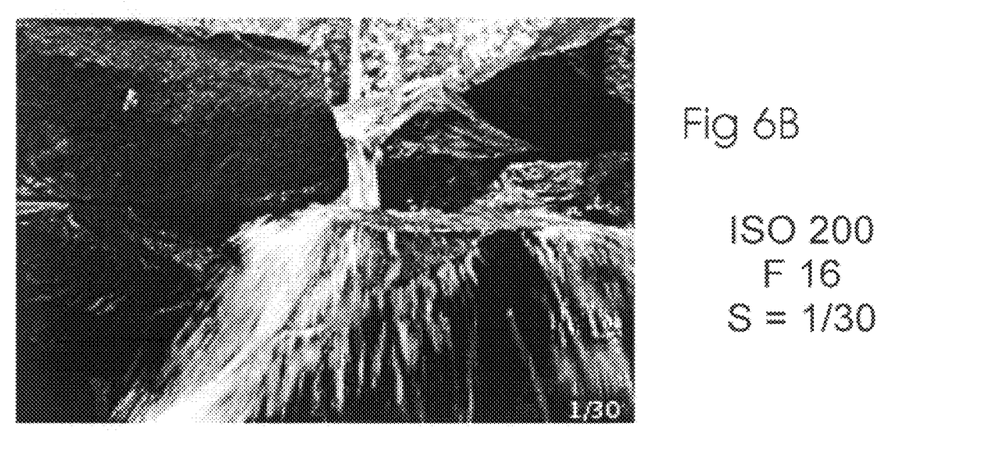
Figure 6C:
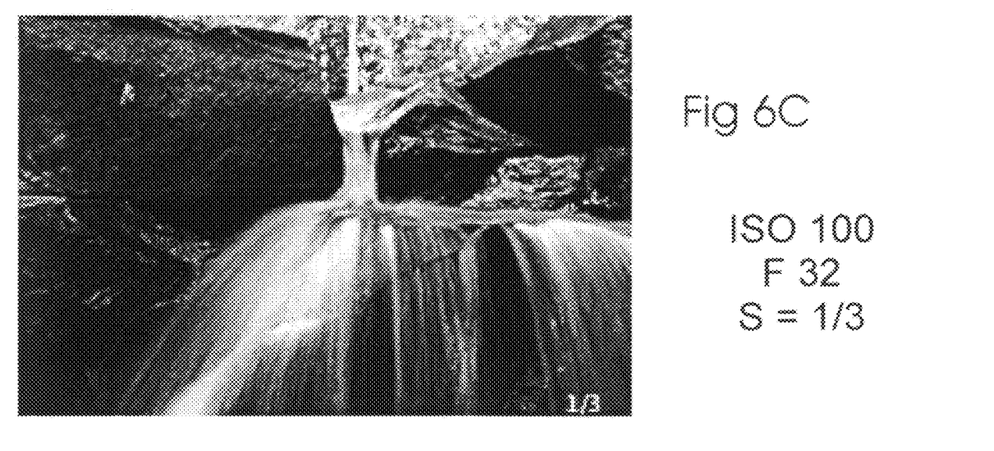

In one important version, a photographer's guidance system in accordance with this teaching includes one responsive to subject matter been photographed as determined via viewpoint (position and attitude) and catalog (library of photo set-up descriptors). Upon determination the subject matter includes moving elements (water), a shutter program is engaged. To offer different photo possibilities to a user, three discrete photo examples from previously stored images are provided as part of a photo set-up descriptor each with a different shutter speed for user review at a display interface. Falling water may appear 'frozen' such as that of the image on FIG. 6A. by making a photo exposure with a fast shutter speed. A subtle motion effect is realized with a slower shutter speed to produce an image similar to that of FIG. 6B. Finally, FIG. 6C illustrates how a slow shutter speed causes an image to have highly blurred water. To properly expose these photographs, one must balance other camera states, i.e. aperture and/or image detector sensitivity (ISO). In certain circumstances, manipulation of exposures by way of two inversely proportional exposure parameters aperture and shutter speed may produce a desired effect which imparts a spectacular look due to subject motion. To balance an exposure, an f-stop (aperture) may be selected as a very large number 16, 32 for example and further a camera ISO may be made small, so the shutter speed can be made slow, or exposure time large; e.g. of the order of 0.5 seconds.

One particular example where this works well relates to an image subject including moving water. Where a guidance system detects that a selected subject includes moving water, for example waterfall of FIG. 6 or where the then art technique suggestion may include adjustments to exposure parameters to arrive at a slow shutter speed.

For any particular chosen image, by way of the photo set-up descriptor including a sample image, an exposure settings recommendation may be presented at a user interface. The exposure settings recommendation may include for example an ISO; aperture; and shutter speed as follows:

ISO 100

Aperture—F32

Shutter Speed—⅓ second

The settings may be manually set or rather, and 'accept' control portion of a control module may be toggled to automatically cause the camera settings to be set in accordance with the suggestion. Thereafter, an exposure is made at the will of the photographer by depressing the shutter release button.

As part of the user interface, a suggested shot may include example images giving a photographer the opportunity to 'preview' the scene to better envisage what is likely to be the result of settings applied. The group of all descriptors of the resultset are all coupled by way of a common subject and each has an example image which may be scrolled serially to aid a user in making a selection.

In one important version of these apparatus, a photo lesson includes suggested composition alternatives. It is possible to arrive at remarkably different photographs from a single viewpoint, or from a viewpoint quite similar with respect to position and attitude compared to a first reference viewpoint. A photograph's composition may be radically different by altering slightly position and attitude.

To teach a photographer about composition alternatives, an apparatus of these systems operated in one 'photo lesson' mode may present example variations of photographs which are associated with a particular shooting vantage. That is, a user first selects a shooting vantage of particular interest. This may be a vantage which is part of a guided tour including a plurality of similar shooting suggestions of cooperative nature. Upon arrival at the actual location, the apparatus detects this condition and provides a response. When the apparatus is operated in a 'lesson/composition' mode, the response is to present at a display user interface a set of images shot from or near the present location. Each of the images presented represent an alternative perspective of a very similar subject matter. A novice photographer may not be able to intuitively "see" these possible compositions naturally. However, upon playback of these composition variations, a user may chosen one particularly photo as most interesting and use it as a guide to realign his actual shooting viewpoint to achieve a similar or identical composition prior to making an actual exposure. In this way, the novice photographer is exposed to expert compositions which tend to teach novices how to arrive at better photographs. The suggested photo compositions arrive at a user interface for review in response to the apparatus having determined a current position and attitude of the system. Of course, it is impossible for a database to be so large that every possible shooting location on the planet can have stored such multiple composition images associated therein, it nevertheless remains a mere engineering exercise to prepare a database of images in such manner associated with important tourist sites and shooting locations where these images have various compositions of interest.

Figure 7A:
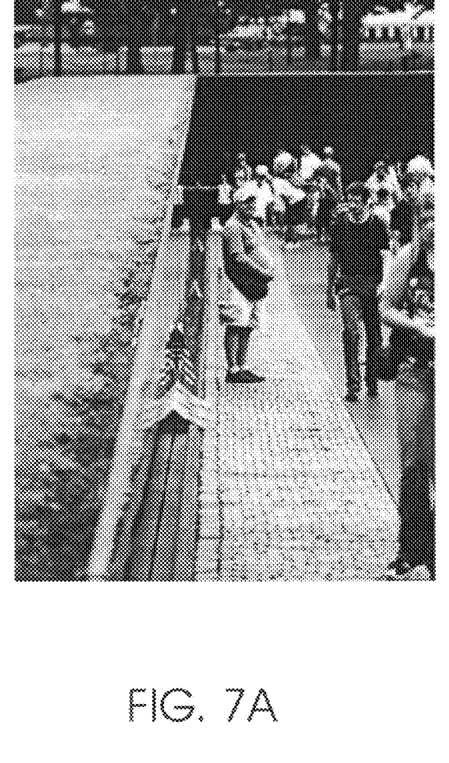
FIGS. 7A and 7B illustrate a shooting vantage suggestion provided by a photographer's guidance system of this disclosure.

The following example illustrates. With respect to the Vietnam Veterans Memorial Wall in Washington, D.C., a shooting vantage point near the end of a particular wall may be included as part of a photo tour of our nation's capital. Upon arrival at the recommended shooting position as defined in the photo tour, the system may be put into a 'lesson/composition' mode. When the mode is activated, images stored in memory which have an association with a particular shooting location are played or presented as a set of alternative composition possibilities. For example, the image of FIG. 7A illustrates a nice composition having strong vertical and horizontal lines in the image and a view of the surrounding park. This image can be studied by the user and an attempt to replicate the image only requires minor adjustments to the angle and precise position of the camera from the site which the camera and photographer is already located.

Figure 7B:
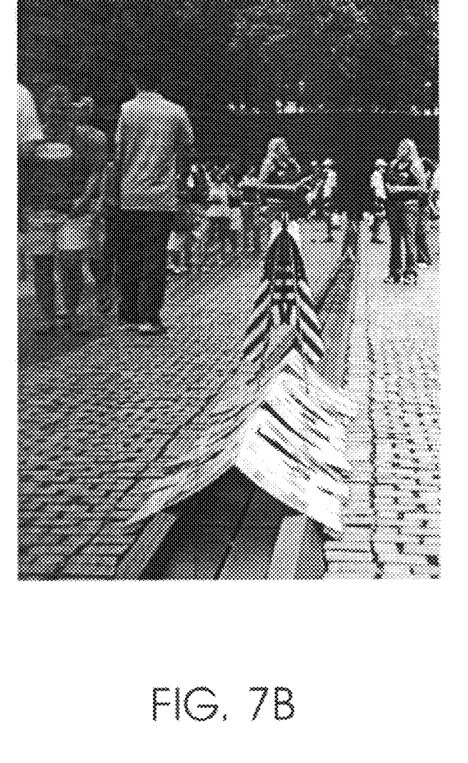

If the image of FIG. 7A is not interesting or pleasing to the photographer, the image of FIG. 7B might be. By automated slide show presentation of a plurality of images, or alternatively by manual thumbwheel scrolling, the presented image displayed on the device may be changed to that represented as FIG. 7B; a nearly identical subject about with considerable change to the shot composition. This shot includes a nice reflection and strong radial lines. It is taken from a very similar viewpoint and the user can easily 'find' this composition merely by fine adjustments to camera angle and position from the user's present location.

Accordingly, photo lessons of these systems include apparatus which operate in a 'composition suggestion' mode. A database of pre-recorded images responds to instantaneous position and attitude with respect to the device and plays back image sets, these image sets including a plurality of images having common associated viewpoint but different composition.

A photographer's guidance system herein may be arranged to propose photographs and guide a user to specific parameters of a photograph including shooting details based upon the system instantaneous location—either by detection via a position determining means, or by declaration as manual input to the device. In one a special version, these photographer's guidance systems may propose an exposure set-up based upon sidereal time. That is, the well-known periodic motion of the cosmos may form basis from which a particular photographer's guidance system may present possible exposure scenarios.

In one example version, a user may place the system into an 'Luna mode' which causes the system to recall from the database various images having therein an image of the moon. From the images that are presented, the user selects those of particular interest. The system then responds by instructing the user to go to a well-defined shooting vantage or viewpoint, and further, to go there at a prescribed time. At the hour proposed, the moon will be in a position approximate to that which was viewed in the image (or, preferably approaching that position). Furthermore, other elements of the photograph subject will be in a perspective represented in the user's selected image. Accordingly in response to a user's location and time, these photographer's guidance systems can direct a photographer just so whereby an image may be made of a rising moon. This is possible as a simple computer algorithm can predict the position of the moon with respect to objects on Earth's horizon at any given time. Of course photographers in Washington, D.C. during a new moon will not be offered a solution as the new moon is not always such an interesting object to photograph. Those who are present during a full moon will receive guidance to the particular location and further a specified time in which the moon will have good alignment with other objects of the intended photograph.

Figure 8A:
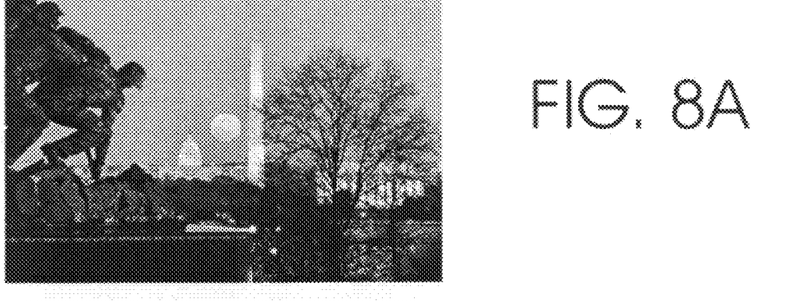
FIGS. 8A-8C illustrate an important version where sidereal time is considered in systems which suggest how to make a photo exposure having a preferred alignment of the moon.
Figure 8B:
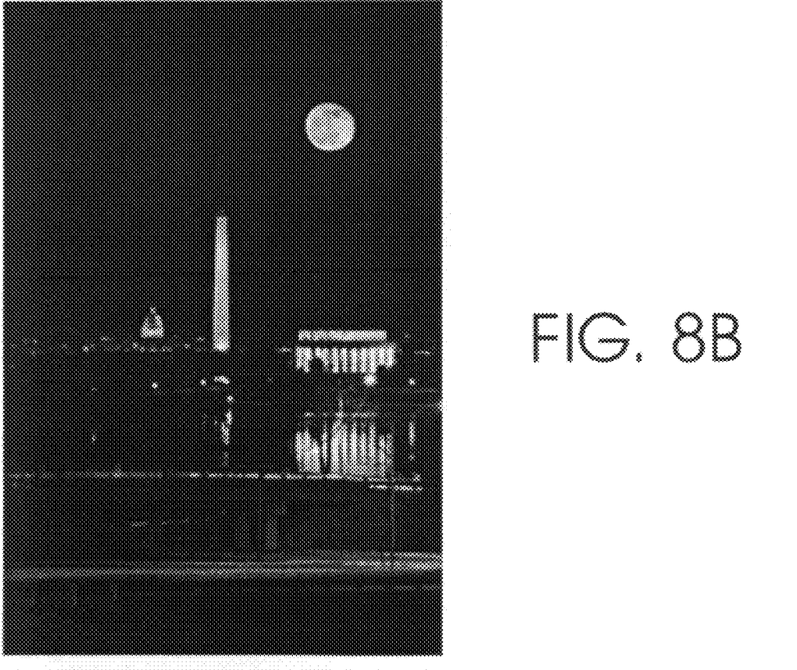
Figure 8C:
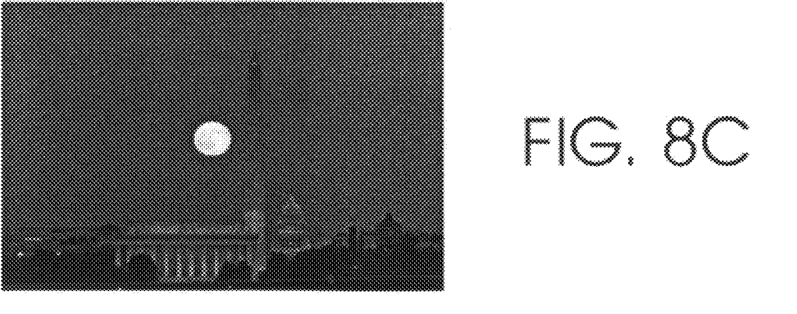

FIGS. 8 A-C illustrates some important photographs having therein the full moon along with other important Washington, D.C. landmarks. These photographs may be presented to a system user during the day just prior to a spectacular moonrise event over the capital. Upon selection of one of the images, the system presents the user a set of shooting parameters including a location and time in which a similar exposure may be made. The user-photographer may proceed to the specified location in advance of the specified time to prepare for the exposure. For example one might wish to put the camera upon a steadying mechanism such as a tripod. Once the moment arrives, and exposure may be made whereby the image captured closely resembles the image played from the database. While the expert observer will note that the moon moves about on the horizon throughout the year, it is appreciated that adjustments to viewpoint can be made to accommodate or at least approximate the alignments selected from preview images.

FIG. 8A shows a Washington, D.C. moonrise where the moon lies with precise alignment just between the Capitol and the Washington Monument. To achieve this, the guidance system proposes the shooting vantage, and the time of day (more precisely time of month) in addition, the system may additionally specify a lens magnification to achieve the proper relative size between objects near and far.

FIG. 8B shows a similar image made from a similar vantage point. However, in this instance the moon has risen a few more degrees and is higher in the sky. Where this image is preferred and selected by a user; then a later shooting time is specified by the computer in response to the user having selected this image from the library.

FIG. 8C is still further a similar image of the moon along with the Capitol Building, the Washington Monument and the Jefferson Memorial. However, the perspective is changed. While the moon is at the same level in the sky compare to FIG. 8A, the alignment of monuments is different. Therefore when a user selects this choice from those offered, the computer directs the photographer to different shooting position or viewpoint.

In each of the shots, the critical element includes a time of day specification to capture the full moon in a moonrise event. While photographers who did not have the advantage of the invention taught here were well advised of moonrise times, this was a manual step which require careful planning and reference to external sources such as moon charts. Further, it is difficult or impossible but at least a manual step to effect any kind of preview of the shot to be made. In contrast, a user who happens to be in Washington, D.C. on a day in which a full moon will occur, the photographer's guidance systems of this disclosure are responsive to those conditions and provides suggested possible shots. Upon selection among those shots, the system responds by providing shooting details such as location, attitude, time and camera settings/states.

Figure 9A:
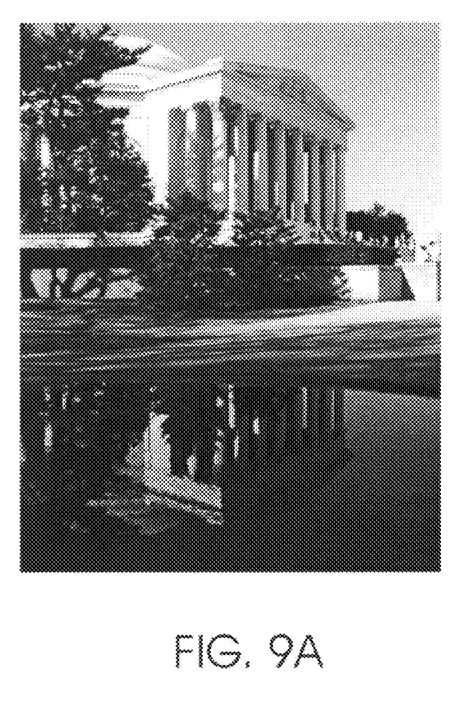
FIGS. 9A and 9B illustrate special images having strong reflections therein—reflections which are enhanced by choosing a certain shooting angle, shooting location, and time of day.
Figure 9B:
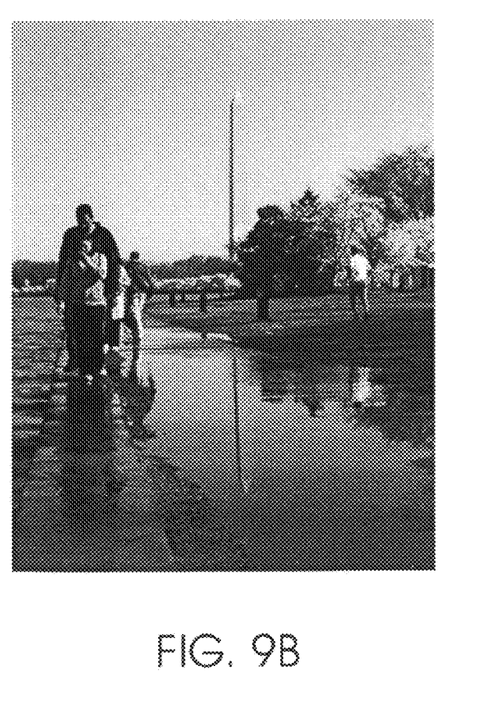

In yet another important illustration of structure which permits these photographer's guidance systems to provide excellent image set-up parameters—a system which is responsive to Internet weather reporting services is described here with reference to the photographs of FIG. 9A and FIG. 9B.

Because some preferred versions of these systems are well coupled to the Internet, they may periodically make calls to Web services such as weather reporting services. Information received in such Internet calls may affect the manner and content which may be offered as suggested photo possibilities.

In one illustrated example, the photographer's guidance systems make automated electronic calls to Internet Web services offering weather reporting. That is, details regarding past, present and future weather conditions may be 'read' from appropriate reporting services. Where certain prescribed conditions exist, the system may response to those conditions (or expected conditions) to propose certain images. That is, a photographers request for photo suggestions may be influenced by information available over the internet whereby the resultset presented depends upon that information so received.

Among the most interesting of such exposure suggestions are those which arise from sunshine following a period of rain. When a system's Internet call returns a weather report which may be characterized as rain followed by sunshine, the system may offer via the system display periphery example images that include images having spectacular reflections. Locations which tend to produce large and lasting puddles of water are 'known' to the database because the database is prepared with data in advance which supports the photography tours and photography lessons described here. When the weather conditions are right for the circumstance, these photographer's guidance systems present suggested images that include images having weather related features that agree with current weather related features. For example, as water puddles are often left behind after a rainstorm, and water puddles make excellent reflections useful in an artistic way in photographs, the system may in response to receipt of an online weather report present suggested images showing puddles having therein reflections of important landmarks. The database is comprised of an image library which includes images of puddles which notoriously provide exceptional reflections. These images are presented after a rainstorm where a user might select from them to receive guidance to a location near the puddle from which an image exposure may be made. In one example image of FIG. 9A, the Jefferson Memorial is shown with its reflection in the foreground where a puddle of water has gathered. Because a similar puddle is likely to form after every rainstorm the system and can reliably predict that such image can be made each time a sufficient rainstorm has passed. When a user selects an image, the system can provide a location of a shooting vantage and direct the photographer there. Similarly known locations such as smooth sidewalks slightly whetted FIG. 9B provide excellent photo vantage point from which wonderful photo exposures may be made as part of a directed photo tour or lesson guide.

Figure 10A:
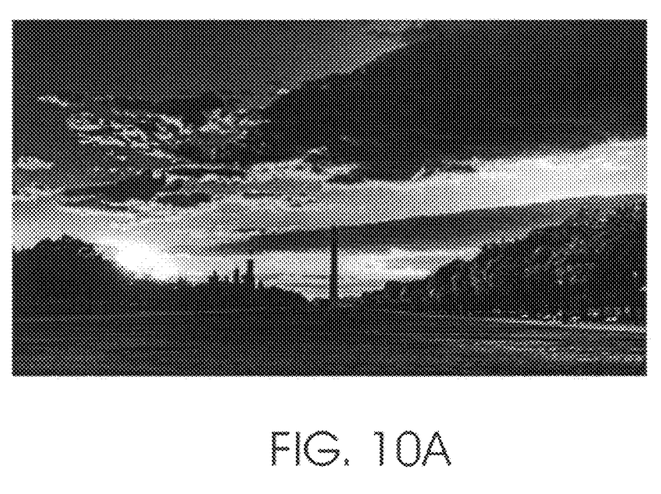
FIGS. 10A and 10B illustrate special sunset images in which are suggested by these systems in view of a real-time weather report gained by way of an Internet connection.
Figure 10B:
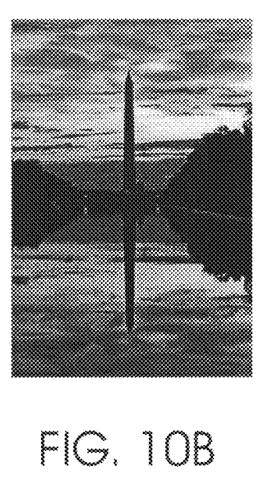
Figure 11A:
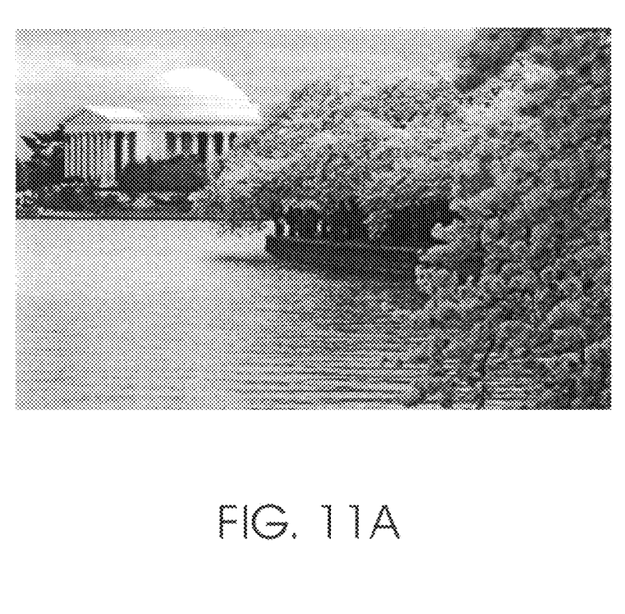
FIGS. 11A and 11B illustrate photo exposures which may be suggested by these systems which are responsive to time of year.
Figure 11B:
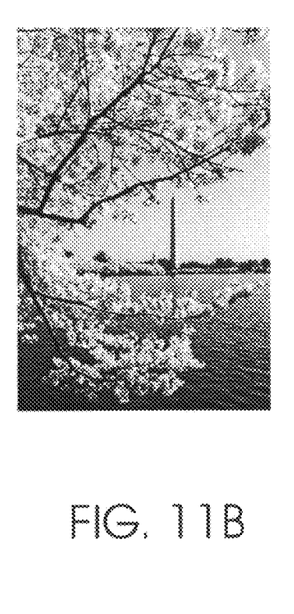

A photographer's guidance system as taught herein may be responsive to both weather conditions and time of day. FIGS. 10A and 10B present examples of amateur photographer favorites—sunset photos. When scattered clouds are known to be in the skies (known via automated calls to weather reporting services), and when the sunset that is approaching in accordance with sidereal time and consideration of location, the system can propose set of images (resultset having a plurality of photo set-up descriptors) having spectacular sunsets in connection with favored landmarks.

Certain versions of these photographer's guidance systems are additionally responsive to time on a larger scale. That is, these systems may be arranged to present photo suggestions relating to the seasons of the year. When a user is making a tourist visit to Washington, D.C. during the cherry blossom bloom which happens at a specific time of year, images presented as suggested shots may include those of FIGS. 11A and 11B. Landmarks including the Jefferson Memorial FIG. 11A and of the Washington Memorial FIG. 11B each have been extensively photographed by wonderful artists with the cherry trees in bloom. As such, these images may be stored in a database and associated with a particular shooting viewpoint or vantage. When a system is called upon at the correct time of year, it may respond by presenting potentially interesting images of a DC landmark in connection with cherry blossoms. Because cherry trees do not move appreciably from year-to-year, and because they are in bloom in a predictable time period, the system can propose excellent shooting vantage points from which photos can be made where one is assured of a great composition having beautiful blossoming trees and favorite landmarks. Accordingly, these systems not only responsive to image subject matter (i.e. falling water, composition variations) but also time, weather, season, et cetera.

The examples above are directed to specific embodiments which illustrate preferred versions of devices and methods of these inventions. In the interests of completeness, a more general description of devices and the elements of which they are comprised as well as methods and the steps of which they are comprised is presented herefollowing.

One will now fully appreciate how photographer's guidance systems based upon computerized processing and stored information operable for making suggested images may be realized. Although the present invention has been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. Electronic photographer's guidance systems comprising:
    a programmed computer;
    a photo set-up library;
    an interactive control module; and
    a display type user interface,
    said photo set-up library is coupled to said programmed computer whereby stored photo set-up descriptors may be recalled and presented at said display type user interface, whereby said recalled photo descriptors characterize and express shooting states of a prescribed and predefined photo opportunity said programmed computer comprises application specific code arranged to administer a photography lesson, said photo lesson is characterized as a shooting angle lesson, said shooting angle is optimized for reflection images.

2. Electronic photographer's guidance systems, comprising:
    a programmed computer;
    a photo set-up library;
    an interactive control module; and
    a display type user interface,
    said photo set-up library is coupled to said programmed computer whereby stored photo set-up descriptors may be recalled and presented at said display type user interface, whereby said recalled photo descriptors characterize and express shooting states of a prescribed and predefined photo opportunity, a query engine coupled to a sidereal clock whereby recalled photo set-up descriptors are dependent upon the position of the cosmos.

3. Electronic photographer's guidance systems of claim 2, said cosmos more specifically include the moon and sun.

* * * * *